US012723894B2

(12) United States Patent
Oikawa et al.

(10) Patent No.: US 12,723,894 B2
(45) Date of Patent: Sep. 1, 2026

(54) INFORMATION PROCESSING DEVICE, MEASUREMENT DEVICE, INFORMATION PROCESSING METHOD, AND STORAGE MEDIUM

(71) Applicant: CASIO COMPUTER CO., LTD., Tokyo (JP)

(72) Inventors: Shuto Oikawa, Tachikawa (JP); Susumu Yamazaki, Kokubunji (JP); Yohei Kawaguchi, Akishima (JP); Takeshi Miyake, Tokyo (JP); Tatsuyoshi Omura, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 390 days.

(21) Appl. No.: 18/283,571

(22) PCT Filed: Feb. 2, 2022

(86) PCT No.: PCT/JP2022/003909
§ 371 (c)(1), (2) Date: Sep. 22, 2023

(87) PCT Pub. No.: WO2022/201884
PCT Pub. Date: Sep. 29, 2022

(65) Prior Publication Data

US 2024/0159564 A1 May 16, 2024

(30) Foreign Application Priority Data

Mar. 22, 2021 (JP) ................................ 2021-047178

(51) Int. Cl.
*G01C 22/00* (2006.01)
*G01P 15/00* (2006.01)

(52) U.S. Cl.
CPC ............ *G01C 22/006* (2013.01); *G01P 15/00* (2013.01)

(58) Field of Classification Search
CPC .............................. G01C 22/006; G01P 15/00
See application file for complete search history.

(56) References Cited

U.S. PATENT DOCUMENTS 7,263,461 B2 * 8/2007 Sugai ...................... G01P 15/00 235/105
10,898,112 B2 * 1/2021 Kitamura ............ A61B 5/6823
(Continued)

FOREIGN PATENT DOCUMENTS

JP H112542 A 1/1999
JP 2004290658 A 10/2004
(Continued)

OTHER PUBLICATIONS

International Search Report dated Apr. 19, 2022 issued in PCT/JP2022/003909.

(Continued)

*Primary Examiner* — Thomas D Alunkal
(74) *Attorney, Agent, or Firm* — Scully, Scott, Murphy & Presser, P.C.

(57) ABSTRACT

An information processing device includes, at least one processor that derives frequency characteristics of time-series data of a measurement result by an acceleration sensor and determines whether the time-series data indicates a running/walking state in accordance with whether all determination conditions including at least a first condition and a second condition are satisfied, the first condition being a condition that a frequency having maximum intensity in the derived frequency characteristics is equal to or higher than a lower limit frequency set in advance, and the second condition being a condition that at least one of the frequency having the maximum intensity or a frequency having second (Continued)

largest intensity in the frequency characteristics falls within a range equal to or higher than the lower limit frequency and equal to or lower than an upper limit frequency set in advance.

14 Claims, 7 Drawing Sheets

(56) References Cited

U.S. PATENT DOCUMENTS

2004/0186695 A1* 9/2004 Aoshima .............. G01C 22/006 702/190
2012/0166133 A1* 6/2012 Ihashi .................. G01C 22/006 73/488
2014/0122012 A1* 5/2014 Barfield ................... G01C 5/06 702/138
2014/0188431 A1* 7/2014 Barfield ................... G01C 5/06 702/160
2014/0365169 A1 12/2014 Pham
2018/0192917 A1* 7/2018 Piijl ........................ G06V 40/25
2020/0001159 A1* 1/2020 Sazuka .................. G06V 40/23
2021/0052196 A1* 2/2021 Nicolas ................... G06F 18/29

FOREIGN PATENT DOCUMENTS

JP 2005342254 A 12/2005
JP 2015503993 A 2/2015

OTHER PUBLICATIONS

Notice of Reasons for Refusal, dated Apr. 19, 2022 issued in JP 2021-047178.

International Preliminary Report on Patentability dated Sep. 12, 2023 received in International Application No. PCT/JP2022/003909.

Chinese Office Action dated Jan. 30, 2026 received in Chinese Application No. 202280024132.0.

* cited by examiner

ACCELERATION ABSOLUTE VALUE
TIME
0
10
20
30
40
50
60

POWER SPECTRUM
S(P1)
S(P2)
Sa
P1
P2
dSth
FREQUENCY
fhmin
f(P2)
f(P1)
fmax
0
1
2
3
4
5
6
7

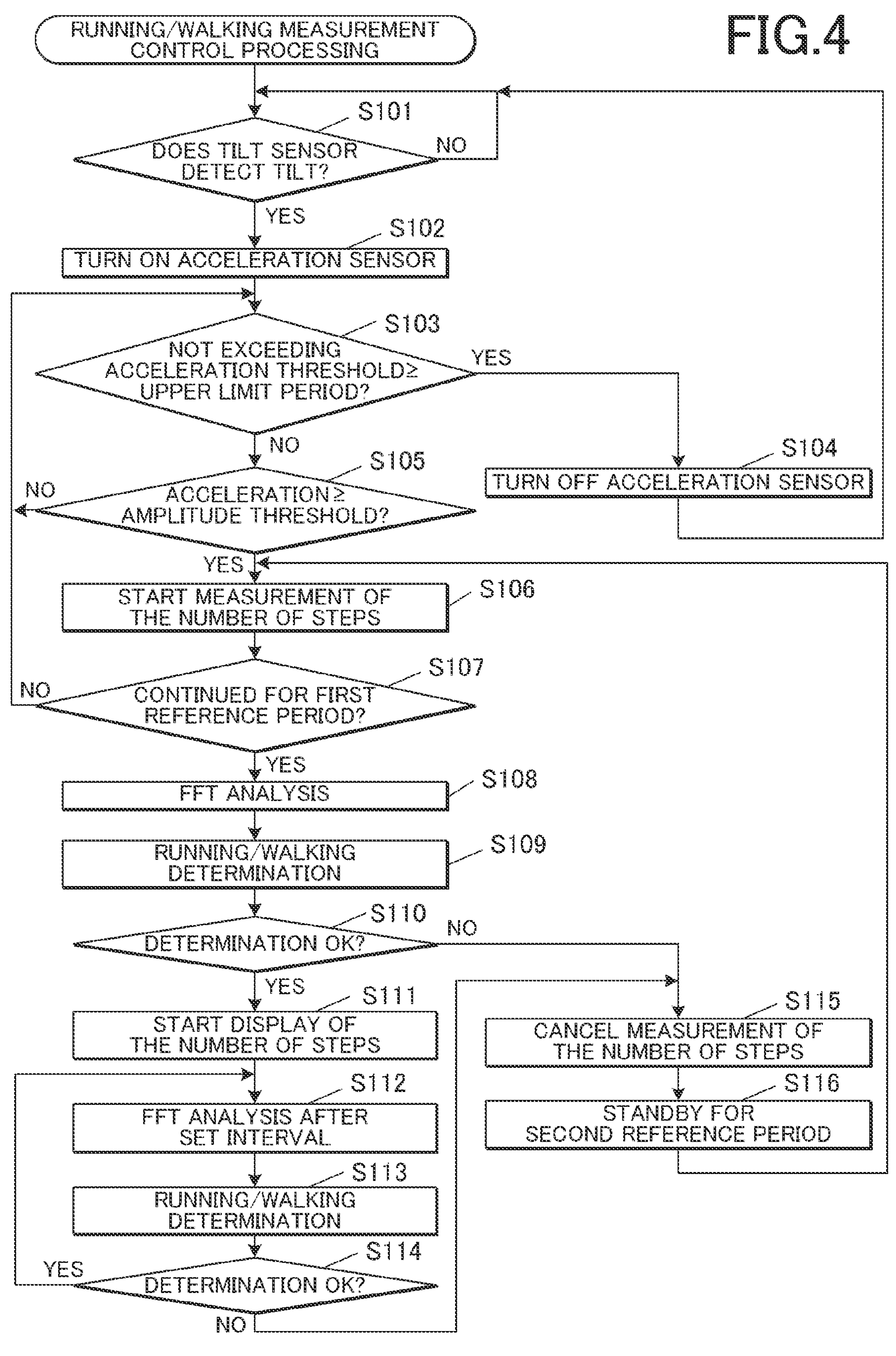
FIG.4
RUNNING/WALKING MEASUREMENT CONTROL PROCESSING
S101
DOES TILT SENSOR DETECT TILT?
NO
YES
S102
TURN ON ACCELERATION SENSOR
S103
NOT EXCEEDING ACCELERATION THRESHOLD≥ UPPER LIMIT PERIOD?
YES
NO
S104
TURN OFF ACCELERATION SENSOR
S105
ACCELERATION≥ AMPLITUDE THRESHOLD?
NO
YES
S106
START MEASUREMENT OF THE NUMBER OF STEPS
S107
CONTINUED FOR FIRST REFERENCE PERIOD?
NO
YES
S108
FFT ANALYSIS
S109
RUNNING/WALKING DETERMINATION
S110
DETERMINATION OK?
NO
YES
S111
START DISPLAY OF THE NUMBER OF STEPS
S115
CANCEL MEASUREMENT OF THE NUMBER OF STEPS
S112
FFT ANALYSIS AFTER SET INTERVAL
S116
STANDBY FOR SECOND REFERENCE PERIOD
S113
RUNNING/WALKING DETERMINATION
S114
DETERMINATION OK?
YES
NO

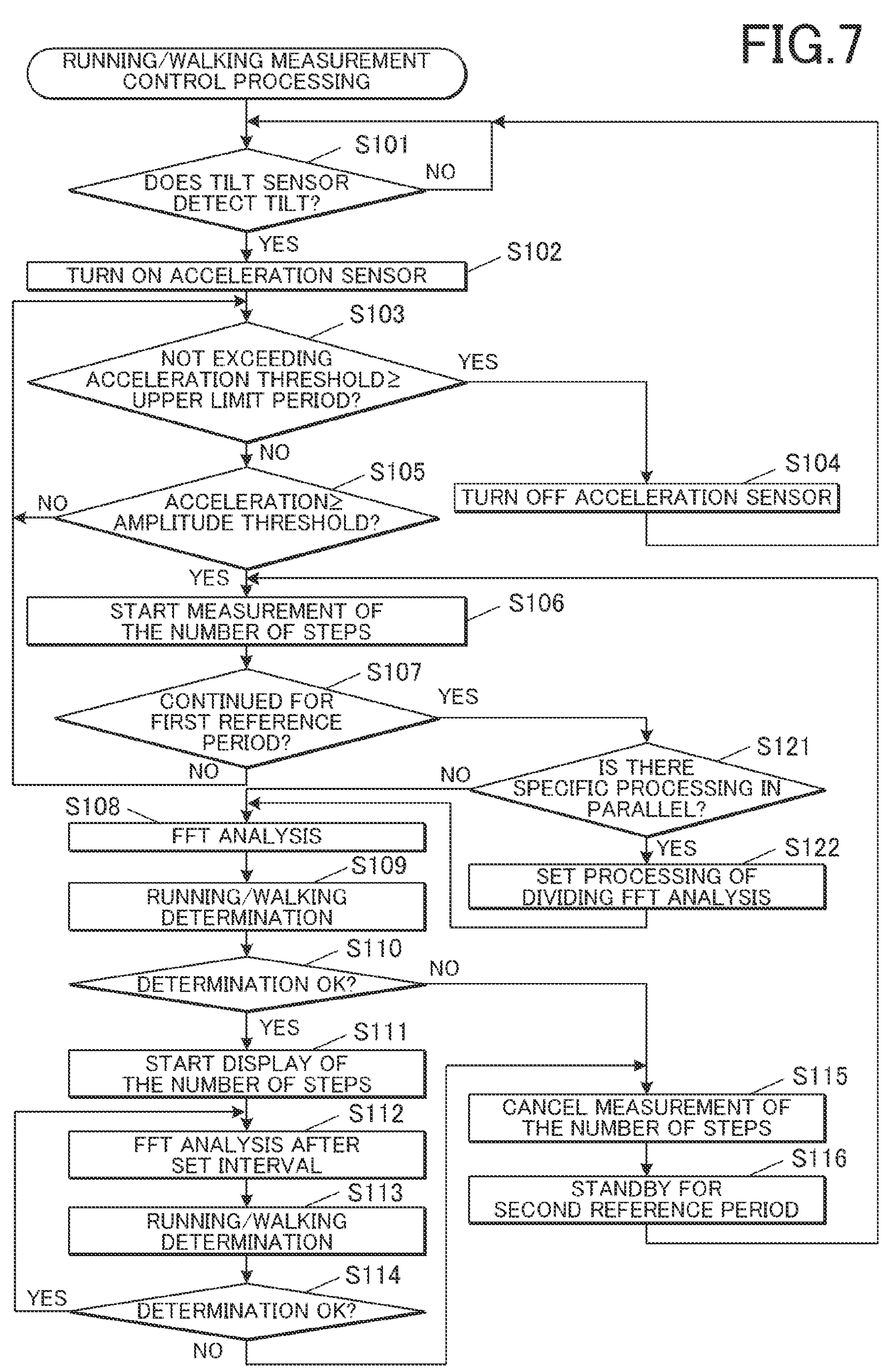
FIG.7
RUNNING/WALKING MEASUREMENT CONTROL PROCESSING
S101
DOES TILT SENSOR DETECT TILT?
NO
YES
S102
TURN ON ACCELERATION SENSOR
S103
NOT EXCEEDING ACCELERATION THRESHOLD≥ UPPER LIMIT PERIOD?
YES
NO
S104
TURN OFF ACCELERATION SENSOR
S105
ACCELERATION≥ AMPLITUDE THRESHOLD?
NO
YES
S106
START MEASUREMENT OF THE NUMBER OF STEPS
S107
CONTINUED FOR FIRST REFERENCE PERIOD?
YES
NO
S121
IS THERE SPECIFIC PROCESSING IN PARALLEL?
NO
YES
S122
SET PROCESSING OF DIVIDING FFT ANALYSIS
S108
FFT ANALYSIS
S109
RUNNING/WALKING DETERMINATION
S110
DETERMINATION OK?
NO
YES
S111
START DISPLAY OF THE NUMBER OF STEPS
S112
FFT ANALYSIS AFTER SET INTERVAL
S113
RUNNING/WALKING DETERMINATION
S114
DETERMINATION OK?
YES
NO
S115
CANCEL MEASUREMENT OF THE NUMBER OF STEPS
S116
STANDBY FOR SECOND REFERENCE PERIOD

INFORMATION PROCESSING DEVICE, MEASUREMENT DEVICE, INFORMATION PROCESSING METHOD, AND STORAGE MEDIUM

CROSS-REFERENCE TO RELATED APPLICATIONS

This application is a national stage entry of PCT International Application No. PCT/JP2022/003909, filed on Feb. 2, 2022, which claims priority to Japanese Patent Application No. JP 2021-047178, filed on Mar. 22, 2021. The entire disclosures of PCT International Application No. PCT/JP2022/003909 and Japanese Patent Application No. JP 2021-047178 are incorporated by this reference.

TECHNICAL FIELD

The present invention relates to an information processing device, a measurement device, an information processing method, and a program that measure walking and running of a user.

BACKGROUND ART

In related art, there has been a measurement device (pedometer) that determines a biped locomotion state of a user, that is, a state where the user is walking or running (collectively, running/walking) by biped locomotion (running/walking state) and measures the number of steps of running/walking (the number of steps). This measurement device is used as means for visualizing an amount of daily activity and exercise of the user. During running/walking, a cyclic acceleration change specific to these kinds of behavior occurs, and thus, the measurement device measures the number of steps by specifying a pattern of such an acceleration change and counting the number of cycles of the acceleration change or the number of times of occurrence of a characteristic change portion or an extreme value.

However, running/walking aspects individually differ depending on users and are slightly different from each other. Further, the acceleration change pattern changes also in accordance with a speed of running/walking. Thus, if it is tried to measure running/walking by stereotypical standards, a problem arises that there are some cases where measurement cannot be correctly performed. JP 2004-290658A discloses a pedometer to be worn on the arm, including an acceleration sensor that detects acceleration in a direction in which waving of the arms during walking and waving of the arms during running can be respectively conspicuously detected, and a technique of specifying cycles of running and walking while distinguishing between running and walking of the user in accordance with a change period of acceleration obtained using Fourier analysis and an emerging pattern thereof.

SUMMARY OF THE INVENTION

Technical Problem

However, an acceleration change occurs in a body of the user not only in a running/walking state, and there is a problem with the technique disclosed in JP 2004-290658A that there is a possibility that states other than the running/walking state, such as a state during movement by a bicycle and a state during use of equipment associated with vibration are erroneously determined as the running/walking state.

An object of the present invention is to provide an information processing device, a measurement device, an information processing method, and a program that can determine whether or not a state is a running/walking state more appropriately.

Solution to Problem

To achieve the above-described object, the present invention is an information processing device including: a processor that derives frequency characteristics of time-series data of a measurement result by an acceleration sensor and determines whether or not the time-series data indicates a running/walking state in accordance with whether or not all determination conditions including at least a first condition and a second condition are satisfied, the first condition being a condition that a frequency having maximum intensity in the derived frequency characteristics is equal to or higher than a lower limit frequency set in advance related to the running/walking state that is a state of walking or running by biped locomotion, and the second condition being a condition that at least one of the frequency having the maximum intensity or a frequency having second largest intensity in the frequency characteristics falls within a range equal to or higher than the lower limit frequency and equal to or lower than an upper limit frequency set in advance related to the running/walking state.

Advantageous Effects of Invention

According to the present invention, an effect that a walking state can be determined more appropriately through easy processing is provided.

BRIEF DESCRIPTION OF THE DRAWINGS

FIG. 4 This is a flowchart indicating control procedure of running/walking measurement control processing.

FIG. 7 This is a flowchart indicating control procedure of running/walking measurement control processing including the running/walking determination in Modification 2.

DESCRIPTION OF EMBODIMENTS

Figure 1:
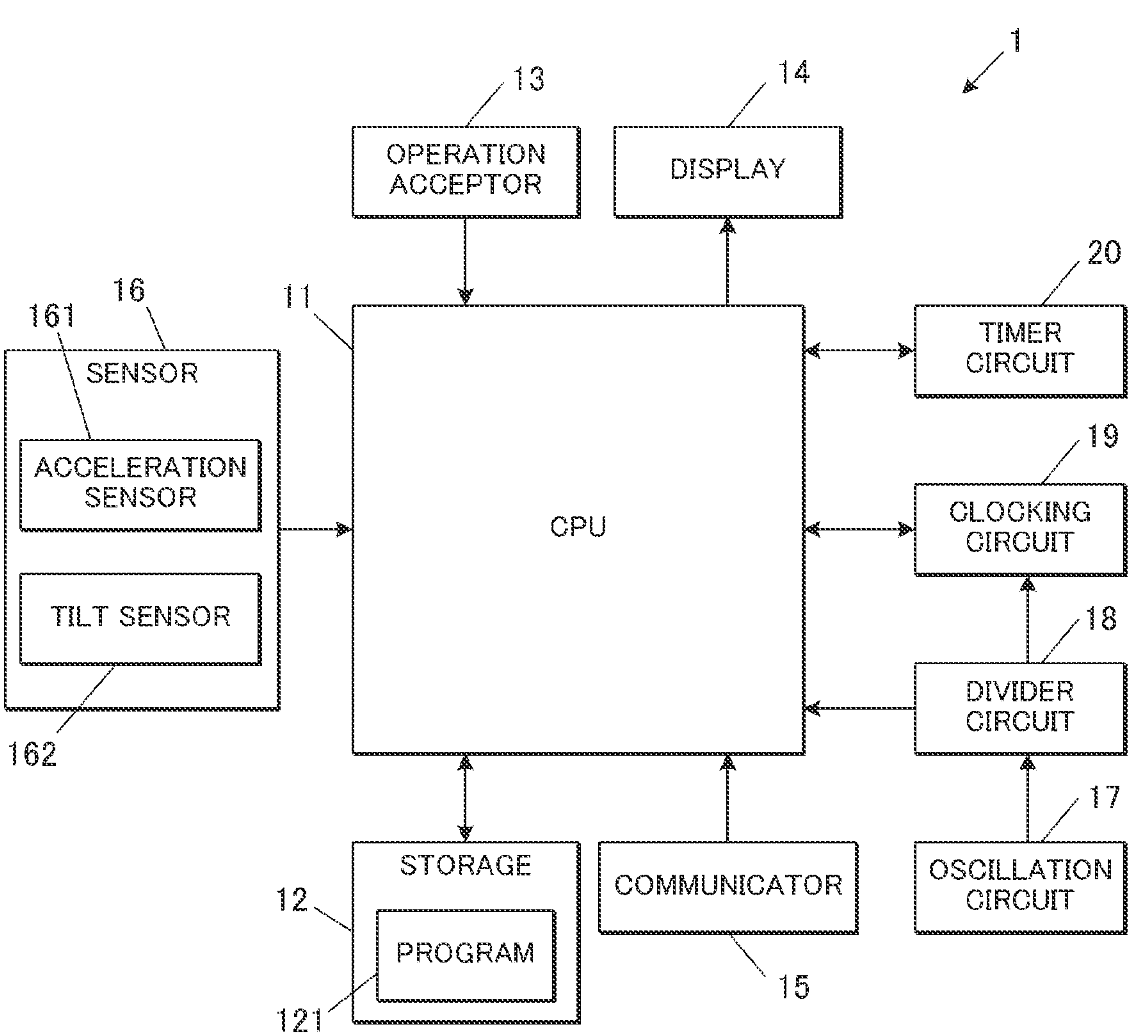
FIG. 1 This is a block diagram illustrating a functional configuration of electronic equipment.

An embodiment of the present invention will be described below by referring to the drawings.

FIG. 1 is a block diagram illustrating a functional configuration of electronic equipment 1 that is a measurement device and an information processing device of the present embodiment.

This electronic equipment 1, which is, for example, a wristwatch to be worn on the arm of a user who is a human, or a pedometer or an active mass-meter to be stored in a pocket, or the like, of the user, includes a central processing unit (CPU) 11, a storage 12, an operation acceptor 13, a display 14, a communicator 15, a sensor 16, an oscillation circuit 17, a divider circuit 18, a clocking circuit 19, a timer circuit 20, and the like.

The CPU 11 is a hardware processor that performs integrated control on operation of the electronic equipment 1 through calculation processing. The CPU 11 reads out and executes a program 121 stored in the storage 12. The operation to be controlled by the CPU 11 includes running/walking determination and measurement of the number of steps related to biped locomotion (walking or running) of a user using a measurement result of acceleration. The CPU 11 is included in the information processing device of the present invention, constitutes a processor of the present invention and controls execution of processing related to running/walking determination as a calculator, running/walking determiner, a step measurer, a determination operation controller and a division controller.

The CPU 11 may be a single hardware processor, or a plurality of hardware processors may operate in parallel or independently in parallel. The plurality of hardware processors may be individually designed to perform dedicated operation assigned with processing to be executed respectively.

The storage 12 includes a volatile memory (RAM) and a non-volatile memory. The volatile memory provides a memory space for work to the CPU 11 and stores temporary data. The non-volatile memory, which is, for example, a flash memory, stores the program 121, configuration data related to operation of the electronic equipment 1, and the like. The program 121 includes a control program of running/walking measurement control processing which will be described later related to measurement of the number of steps and running/walking determination.

The operation acceptor 13 accepts operation from outside by the user or the like, and outputs an input signal based on the input operation to the CPU 11. The operation acceptor 13 includes, for example, one or a plurality of push button switches. Further, the operation acceptor 13 may include a crown, a touch panel, and the like.

The display 14, which includes, for example, a digital display screen, performs display on the digital display screen on the basis of control by the CPU 11. The digital display screen is, for example, a liquid crystal display screen, but not limited to this. The digital display screen may be, for example, an electro luminescent (EL) display screen. Note that the display 14 may perform analog display using behavior of an indicator, or the like, instead of the digital display screen.

The communicator 15 controls wireless communication with external equipment in accordance with communication standards. The communication standards that can be controlled by the communicator 15 are not particularly limited, but include, for example, Bluetooth (R). The communication standards may include, various kinds of communication standards related to a wireless local area network (LAN) and the like. The communicator 15 can, for example, transmit history data of measurement and analysis data thereof by the sensor 16, to external electronic equipment.

The sensor 16 outputs measurement data obtained by measuring a physical amount to the CPU 11. The sensor 16 includes, for example, an acceleration sensor 161 and a tilt sensor 162.

The acceleration sensor 161 measures acceleration in three axis directions that are orthogonal to one another and outputs the measurement result. The acceleration sensor 161 may output acceleration of each component of the three axis directions as is, or may derive the magnitude of an acceleration vector (absolute value of a value obtained by synthesizing components of the three axis directions) and then output the magnitude. The acceleration sensor 161 is used to detect a characteristic acceleration change related to landing/leaving associated with the running/walking of the user to measure the number of steps. When the user runs/walks, periodicity occurs in up-and-down motion of the body in association with the movement of the center of gravity, twist of the body to right and left by the user alternately taking steps with each foot, forward-and-backward motion of the body (arms) by waving of the arms and the like (including up-and-down motion when running), and the like. In the electronic equipment 1, a sampling frequency (acquisition frequency) of measurement by the acceleration sensor 161 is not set at extremely high compared to the running/traveling period to reduce power consumption. Thus, the acceleration sensor 161 only requires to be able to perform measurement at a sampling frequency at which the spectral intensity in an upper limit of a frequency range assumed in running/walking of a human can be detected through frequency analysis. A Nyquist frequency that can be detected through frequency analysis is half of the sampling frequency. Thus, although not particularly limited, for example, the acceleration sensor 161 measures acceleration using a frequency equal to or lower than four times, for example, three to four times a highest frequency fmax assumed in running/walking of a human, as the sampling frequency.

The tilt sensor 162 detects a change (tilting operation) of a tilting state of the electronic equipment 1. A change of the tilting state mainly occurs in accordance with use or transportation of the electronic equipment 1 by the user and is used to determine whether or not the electronic equipment 1 remains untouched in a non-use state. Power consumption related to operation of the tilt sensor 162 is smaller than power consumption related to operation of the acceleration sensor 161.

In addition, the sensor 16 may include a sensor that performs environmental measurement such as a magnetic field sensor (orientation sensor), a barometer (altitude sensor), an illuminance sensor and a temperature sensor, a sensor that performs physical measurement such as an optical pulse sensor, and the like.

The oscillation circuit 17 oscillates a signal at a certain frequency and outputs a signal with the oscillated frequency as a clock signal. The divider circuit 18 converts the clock signal output from the oscillation circuit 17 into another frequency signal by dividing a frequency and outputs the other frequency signal. The clocking circuit 19 counts the number of times of input of signals at an appropriate frequency input from the divider circuit 18 to hold current date and time.

The timer circuit 20 counts the clock signals of the number in accordance with a set period of time and outputs a signal that informs the CPU 11 of elapse of the set period of time.

The above-described each component operates by power being supplied from a battery (not illustrated) directly or via the CPU 11. Whether or not to supply power to each component may be independently switchable. While the battery is not particularly limited, the battery may be a rechargeable battery (such as a lithium ion rechargeable battery) or a dry-cell battery (such as a button-shaped battery) and may be detachable and exchangeable.

Running/walking determination operation of the present embodiment will be described next.

The electronic equipment 1 performs running/walking determination operation while reducing processing load compared to a case where data in the three axis directions is respectively processed, by detecting a temporal change of a magnitude of an acceleration vector obtained by measurement by the acceleration sensor 161, that is, a temporal change of an absolute value (hereinafter, referred to as an absolute value of acceleration) obtained by synthesizing three-axis components of acceleration on the basis of time-series data of the measurement result of the acceleration sensor 161. In a case where the absolute value of the acceleration is not calculated by the acceleration sensor 161, the CPU 11 performs processing of deriving an absolute value of the acceleration by synthesizing components of the acquired acceleration in three axis directions.

Figures 2A, 2B:
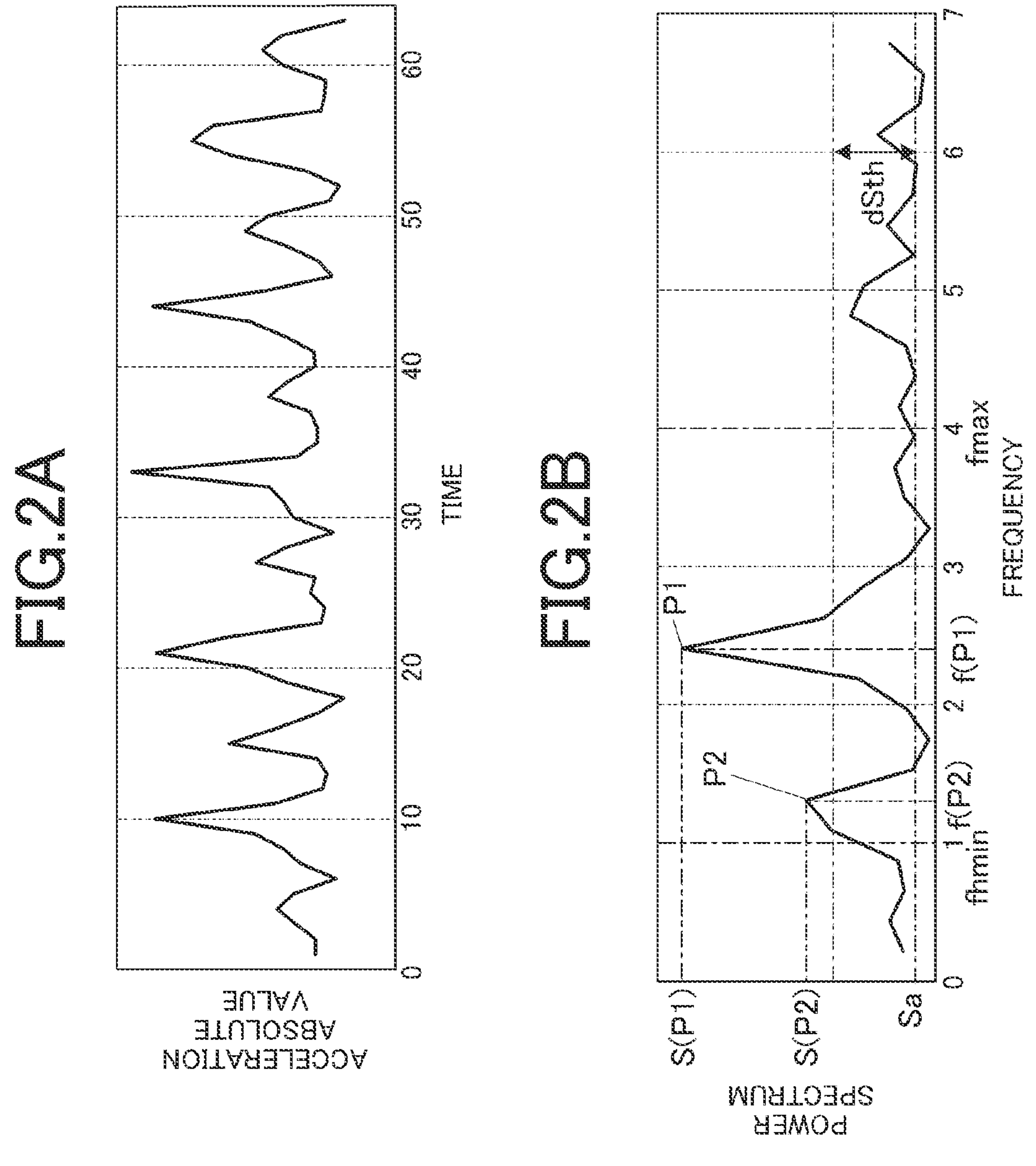
FIG. 2A This is a view indicating a measurement example of acceleration during walking.
FIG. 2B This is a view indicating a measurement example of acceleration during walking.

FIG. 2A and FIG. 2B are views indicating a measurement example of acceleration during walking.

FIG. 2A indicates an example of a temporal change of an absolute value of acceleration during walking. During walking, a large change occurs in acceleration at a timing at which the user lifts the heel against the ground, and the like, and, further, an absolute value of acceleration periodically becomes large along with waving of the arms and twist of the body occurring at the timing. This cycle includes a cycle for each step (one-step cycle) and a cycle for each of two steps (two-step cycle).

FIG. 2B is a view indicating frequency spectral intensity of the absolute value of the acceleration including the above-described period of time. In the distribution of the frequency spectral intensity (frequency characteristics), a prominent peak P2 located at a frequency f(P2) between 1 Hz and 2 Hz, and a prominent peak P1 located at a frequency f(P1) between 2 Hz and 3 Hz appear. However, a way of walking and the acceleration change and the distribution of the frequency spectral intensity in association with the way of walking differ in accordance with persons and conditions. In other words, each magnitude of the one-step cycle and the two-step cycle and a ratio of the one-step cycle and the two-step cycle differ among in a case of walking in an unbalanced manner between the left leg and the right leg, in a case where waving of the arms or twist of the body are less likely to occur (particularly on one side) by carrying a baggage or the like, in a case where an elderly person, a sick and wounded person, or the like, walks in an asymmetric manner as a result of dragging his/her one foot, and up-and-down motion of the center of gravity being less likely to occur, and in a case where a typical young person walks in a balanced manner. Further, a magnitude of up-and-down motion of the center of gravity, directions of the arms, and a magnitude of waving of the arms largely differ between walking and running, and thus, the ratio of a magnitude of a component of the acceleration change occurring in the one-step cycle and a magnitude of a component of the acceleration change occurring in the two-step cycle differs between walking and running. Still further, there is a case where a ratio of the one-step cycle and the two-step cycle differs in accordance with a place where the electronic equipment 1 is attached. In a case where such an intensity ratio between the component of the acceleration change of the one-step cycle and the component of the acceleration change of the two-step cycle is extremely large, there is a case where only one of the peaks indicating the one-step cycle and the two-step cycle respectively appears in the frequency spectral distribution, and which one of them appears is not fixed. Further, in a case where one of the two peaks is weak, there can be a case where a peak of the frequency component due to other factors is large, and the weaker peak does not become the second largest peak.

The electronic equipment 1 performs running/walking determination at preset intervals separately from measurement of the number of steps performed in substantially real time on the basis of the temporal change of the acceleration. Further, even in a case where a change pattern of acceleration that can be counted as one step is detected in measurement of the number of steps, in a case where it is determined through running/walking determination that the state is not a running/walking state, measurement of the number of steps is cancelled.

Concerning a technique of measuring the number of steps by detecting a characteristic acceleration change pattern related to running/walking of the user of the electronic equipment 1 on the basis of the time-series data of the absolute value of acceleration, a publicly known related art can be applied, and the acceleration change pattern may be, for example, based on change speed (tilt), or the like, of the magnitude of the acceleration vector. Detailed description will be omitted here.

In the running/walking determination, the CPU 11 performs Fourier transform (processing as a calculator that derives frequency characteristics) on acceleration data (time-series data) in the latest target period of time of a length set in advance to acquire frequency spectral distribution (frequency characteristics). Fourier transform may be fast Fourier transform (FFT) that is publicly known related art. Then, the CPU 11 specifies a plurality of local maximum values of spectral intensity distribution in the target period of time and specifies a frequency (a maximum intensity frequency f(P1), a frequency of a peak P1 in FIG. 2B, which is also a frequency with the largest spectral intensity among all) in which a spectrum (power spectrum) has a local maximum value of maximum intensity among the specified plurality of local maximum values, and a frequency (a second largest intensity frequency f(P2), a frequency of a peak P2 in FIG. 2B, which is also a frequency with the second largest spectral intensity among all) in which the spectrum has a local maximum value of the second largest spectral intensity.

The length of the target period of time of FFT may be determined short in a range in which frequency resolution that clearly separates the maximum intensity frequency f(P1) from the second largest intensity frequency f(P2) is obtained in terms of reduction in processing and improvement in real time characteristics. In a case where the maximum intensity frequency f(P1) and the second largest intensity frequency f(P2) respectively indicate frequencies corresponding to the one-step cycle and the two-step cycle, and one-step cycles of two steps are not largely different from each other, the lower frequency (corresponding to the two-step cycle) between the two becomes approximately half of the higher frequency (corresponding to the one-step cycle), and a difference between the maximum intensity frequency f(P1) and the second largest intensity frequency f(P2) is a residue obtained by subtracting the lower frequency from the higher frequency and becomes approximately the lower frequency (corresponding to the two-step cycle), and thus, the length of the target period of time of FFT is determined to be approximately a period of time (cycle) in accordance with a frequency (for example, approximately ⅓ to ⅕ of a lowest frequency fhmin which will be described later) which is lower than half of the lower limit (the lowest frequency fhmin) of a frequency range of the two-step cycle assumed in running/walking of a human. Further, the length of this target period of time may be shorter than an interval of execution of the running/walking determination that is performed intermittently. In other words, the time-series data of acceleration does not have to be used in an overlapped manner to derive frequency characteristics in a plurality of times of frequency analysis (running/walking determination).

Further, in the running/walking determination, movement of the user other than running/walking or a large acceleration change due to disturbance are removed in the frequency spectral distribution as a non-running/walking state that is not the running/walking state.

Specific cases that should be determined as the non-running/walking state can include a case where the electronic equipment 1 is subject to impact by hitting somewhere or falling on the ground (such as a case where a peak of spectral intensity occurs over a wide range outside a range that is assumed in running/walking), a case where a no-swing and non-cyclic rattling, impact with low frequency, or the like, occurs by driving of a bicycle, a motorcycle, or the like (such as a case where acceleration is large in a wide frequency band, particularly, at a low frequency, and a peak occurs according to circumstances, a peak of spectral intensity in a range assumed in running/walking is not necessarily larger than other peaks, frequencies at which local maximum values are obtained are different), a case where the body incidentally moves during rest (such as a case where spectral intensity of the local maximum values is small), and the like.

Further, the non-running/walking state can include movement in which the number of steps measured by measurement of the number of steps significantly increases than in reality in principle by an acceleration component by vibration that is significantly larger than the running/walking state being measured in conjunction although running/walking (which can include temporal suspension) is actually performed. Such movement can include, for example, running/walking while pushing a shopping trolley or a lawn mower.

In the removal of the non-running/walking state as described above, in a case where large vibration occurs in the body of the user at a frequency other than the frequency assumed in running/walking, specifically, it is determined whether or not a frequency with maximum spectral intensity is located at a position lower than the lowest frequency fhmin (lower limit frequency related to the running/walking state set in advance) assumed in the two-step cycle (the first condition).

Further, as described above, which one of the one-step cycle and the two-step cycle is measured is unknown, and even if local maximum values of the spectral intensity apparently appear on two frequencies, these are not limited to a set of the local maximum values corresponding to the one-step cycle and the two-step cycle, and thus, it is determined whether or not at least one of these two peak frequencies f(P1) and f(P2) falls within a frequency assumed in running/walking that is equal to or higher than the lowest frequency fhmin assumed in the two-step cycle and equal to or lower than the highest frequency fmax (upper limit frequency related to the running/walking state set in advance) assumed in the one-step cycle (second condition). While it is assumed here as one example that the lowest frequency fhmin=1 Hz and the highest frequency fmax=4 Hz, that is, a running/walking frequency that can be included is 1 to 8 Hz, the frequencies may be appropriately set. Further, for example, the lowest frequency fhmin and the highest frequency fmax based on the separately assumed frequency ranges may be set while distinguishing among the walking state, the running state, moving up and down on a slope, and the like, in accordance with, for example, a magnitude of the acceleration vector that becomes larger during running than during walking, presence or absence of a unique waveform pattern in accordance with waving of the bended arms, jumping, and the like, during running, presence or absence of a slope determined from an asymmetric magnitude between upon raising the foot against a slope surface and upon landing, and the like.

Further, to remove a case where vibration occurs also in a frequency range assumed in running/walking due to an acceleration change in other frequency bands, it is determined whether or not spectral intensity S(P1) and S(P2) of the above-described highest intensity frequency f(P1) or the second largest intensity frequency f(P2) within this frequency range, which is maximum spectral intensity (interval maximum intensity) in this frequency range is greater than an average value Sa (average intensity) of the spectral intensity in an entire frequency by equal to or greater than a reference value dSth (reference width related to running/walking) set in advance (third condition related to a magnitude relationship between the interval maximum intensity and the average value Sa). Note that the average value Sa can be small depending on a determination period of time, and thus, the above-described reference value dSth may be determined in accordance with the determination period of time.

In the electronic equipment 1, the CPU 11 determines that the state is the running/walking state in a case where all determination conditions including at least the first to the third conditions described above are satisfied (operation as a running/walking determiner).

In this manner, by performing FFT with a small number of pieces of measurement data at a non-high sampling frequency, and intermittently at appropriate intervals separated from the measurement of the number of steps, it is possible to determine the running/walking state more appropriately than related art without increasing processing load to too high.

Note that while a case has been described above where the local maximum values of the frequency spectral distribution are specified, in resolution to an extent at which f(P1) can be separated from f(P2), there is a case where a frequency peak in accordance with an acceleration change by disturbance and the peaks f(P1), f(P2) are adjacent to one another, and cannot be separated as different peaks. Thus, a frequency with maximum spectral intensity may be simply set as f(P1) and a frequency with the second largest spectral intensity may be set as f(P2) without specifying local maximum values.

Figure 3:
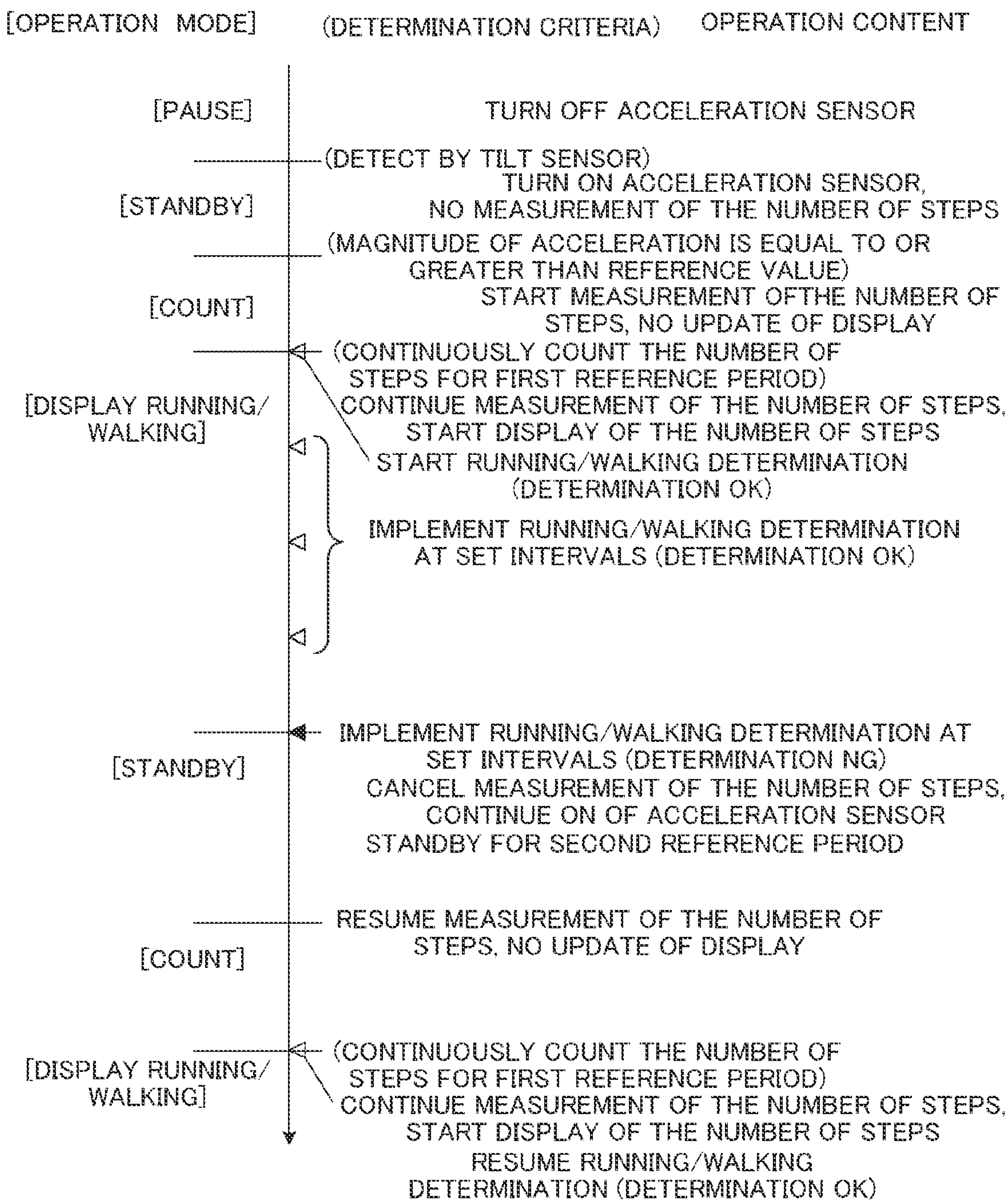
FIG. 3 This is a view illustrating an example of flow of measurement of the number of steps and running/walking determination.

FIG. 3 is a view indicating an example of flow of measurement of the number of steps and running/walking determination.

If the acceleration sensor 161 is in an OFF state (pause mode), and the tilt sensor 162 detects a change of a tilting state, the acceleration sensor 161 is turned ON, and measurement of acceleration is started. In this state, the number of steps is not measured (standby mode).

In the standby mode, if an absolute value of acceleration obtained by measurement by the acceleration sensor 161 exceeds an amplitude threshold related to running/walking, measurement of the number of steps is started (counting mode). The number of steps is measured in real time, for example, on the basis of standards in related art such as detection of a characteristic acceleration change pattern in the absolute value of the acceleration. In this state, even if the characteristic acceleration change pattern is detected, and the number of steps changes, display of the number of steps by the display 14 is not updated.

In a case where measurement of the number of steps (increase of the number of steps) continues after a first reference period of time (for example, ten seconds) has elapsed since measurement of the number of steps had been started, measurement of the number of steps is continued, and periodic running/walking determination is started. If it is determined in the running/walking determination that the state is the running/walking state (OK, displayed with white triangles in FIG. 3 and subsequent drawings), update of display of the number of steps is started (running/walking display mode).

Then, in the running/walking display mode, the running/walking determination is periodically performed at a determined interval, and measurement of the number of steps is continued while it is determined that the state is the running/walking state. In a case where it is determined through the running/walking determination that the state is not the running/walking state (NG, displayed with black circles in FIG. 3 and subsequent drawings), measurement of the number of steps is cancelled. In this event, operation of the acceleration sensor 161 is continued while the determination that the state is not the running/walking state and the cancellation of the measurement of the number of steps are maintained, and the CPU 11 stands by until a second reference period of time (a certain reference period of time, for example, 20 seconds) has elapsed after it has determined that the state is not the running/walking state (standby mode).

After the standby, measurement of the number of steps based on measurement by the acceleration sensor is resumed, but the display of the number of steps is not updated at the beginning (counting mode).

In a case where the number of steps is continuously measured while the second reference period has elapsed, running/walking determination is resumed, and if it is determined that the state is the running/walking state, updating of display of the number of steps by the display 14 is resumed while measurement of the number of steps is continued (running/walking display mode).

In this manner, in a case where it is determined through running/walking determination that the state is not the running/walking state, the mode is forcibly changed to the standby mode regardless of conditions of the measurement of the number of steps so far, and the mode is not immediately returned to the measurement of the number of steps (specification processing assuming the running/walking state) assuming that the state is not the running/walking state during the second reference period of time.

FIG. 4 is a flowchart indicating control procedure by the CPU 11 in the running/walking measurement control processing. In a case where the electronic equipment 1 always performs measurement related to running/walking, the running/walking measurement control processing including content of the information processing method and the program of the present invention is started when the electronic equipment 1 is started, and in a case where the measurement related to running/walking is performed by invoking a function of measurement related to running/walking, the running/walking measurement control processing is started when a start command of the function is acquired via the operation acceptor 13 or the like.

If the running/walking measurement control processing is started, the CPU 11 determines whether or not a detection signal of tilting movement is acquired from the tilt sensor 162 (step S101). In a case where it is determined that the detection signal of tilting movement is not acquired (step S101: No), the CPU 11 repeats the processing in step S101.

In a case where it is determined that the detection signal of tilting movement is acquired (step S101: Yes), the CPU 11 starts power supply to the acceleration sensor 161, turns ON the acceleration sensor 161 to operate and starts acquisition of measurement data of acceleration at the sampling frequency set in advance (step S102). Note that the CPU 11 may delete the acquired data of acceleration, which is no longer used in measurement of the number of steps or running/walking determination since a period of time has elapsed, sequentially or collectively every time when a predetermine period of time has elapsed.

The CPU 11 calculates an absolute value of the acceleration and determines whether or not a condition where this absolute value does not exceed an amplitude threshold continues for a period of time equal to or longer than an upper limit period of time set as appropriate (step S103). In a case where it is determined that the condition where the absolute value does not exceed the amplitude threshold continues for equal to or longer than the upper limit period of time (step S103: Yes), the CPU 11 turns OFF the acceleration sensor 161 and cancels the operation (step S104). The processing of the CPU 11 returns to step S101.

Note that before the processing in step S104, it is determined whether or not the CPU 11 acquires a detection signal of tilting movement from the tilt sensor 162 and only in a case where it is determined that the detection signal is not acquired, the processing of the CPU 11 may return to step S101. In a case where the CPU 11 acquires the detection signal of tilting movement from the tilt sensor 162, the CPU 11 initializes a value of a counted duration during which the absolute value does not exceed the amplitude threshold and returns the processing to step S103.

In the determination processing in step S103, in a case where it is determined that a condition where the absolute value of the acceleration does not exceed the amplitude threshold does not continue for equal to or longer than the upper limit period of time (step S103: No), the CPU 11 determines whether or not the absolute value of the acceleration acquired from the acceleration sensor 161 exceeds the amplitude threshold (step S105). In a case where it is determined that the absolute value of the acceleration does not exceed the amplitude threshold (step S105: No), the processing of the CPU 11 returns to step S103.

In a case where it is determined that the absolute value of the acceleration exceeds the amplitude threshold (step S105: Yes), the CPU 11 starts measurement of the number of steps based on time-series data of the absolute value of the acceleration (step S106).

The CPU 11 continues measurement of the number of steps for the first reference period of time from the start of the measurement, during which it is determined whether or not increase of the number of steps is continued (step S107). In a case where it is determined that increase of the number of steps is not continued for the first reference period of time, for example, in a case where the number of steps does not increase for equal to or longer than a period of time longer than a cycle of one step in a case of slow walking, for example, for two seconds (step S107: No), the processing of the CPU 11 returns to step S103. In this case, the number of steps measured in the interim may be made invalid and does not have to be added to a cumulative number of steps, and the like.

In a case where it is determined that increase of the number of steps is continued for the first reference period of time (step S107: Yes), the CPU 11 performs frequency analysis using FFT (FFT analysis) on the time-series data of the acceleration in the target period of time (step S108). The CPU 11 performs running/walking determination by determining whether or not frequency spectral distribution obtained by the FFT analysis performed in the processing in step S108 satisfies the above-described first to third conditions (determination conditions) (step S109). The CPU 11 determines whether or not a result of the running/walking determination is the running/walking state (OK) (step S110). In a case where it is determined through the running/walking determination that the state is not the running/walking state (step S110: No), the processing of the CPU 11 transitions to step S115.

In a case where it is determined through the running/walking determination that the state is the running/walking state (step S110: Yes), the CPU 11 starts display of the counted number of steps by the display 14 and updating of the display (step S111). The display may be updated in real time or may be updated for each unit time. The CPU 11 performs FFT analysis on the time-series data of the acceleration in the target period of time after a set interval has elapsed in a state where measurement of the number of steps and updating of the display are maintained (step S112). The CPU 11 executes the above-described running/walking determination on the basis of data of the frequency spectral distribution obtained through the FFT analysis performed in the processing in step S112 (step S113). The CPU 11 determines whether or not it is determined that a result of the running/walking determination is the running/walking state (OK) (step S114). In a case where it is determined through the running/walking determination that the state is the running/walking state (step S114: Yes), the processing of the CPU 11 returns to step S112. In a case where it is determined through the running/walking determination that the state is not the running/walking state (step S114: No), the processing of the CPU 11 transitions to step S115.

If the processing transitions from the determination processing in steps S110 and S114 to the processing in step S115, the CPU 11 cancels operation of counting the number of steps (step S115). The CPU 11 stands by during the second reference state since the operation of counting the number of steps has been cancelled (step S116). Then, the processing of the CPU 11 returns to step S106.

Note that the processing may transition from the processing in step S116 to the processing in step S103 instead of transitioning to the processing in step S106. There is also a case where the state transitions to a rest state with small acceleration during standby for the second reference period of time, and thus, in this case, the standby mode may be extended until the acceleration becomes equal to or higher than the amplitude threshold.

The processing in steps S108 and S112 corresponds to calculating step in the information processing method of the present invention and to a calculator in the program 121. Further, the processing in steps S109 and S113 corresponds to running/walking determining step in the information processing method of the present invention and a running/walking determiner in the program 121. The processing in steps S107, S108 and S112 by the CPU 11 corresponds to a determination operation controller of the present invention.

Modification 1

Figure 5:
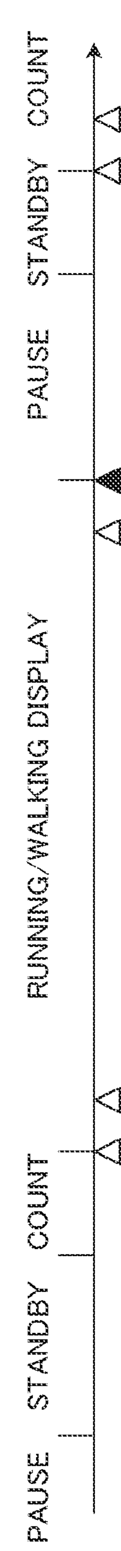
FIG. 5 This is a view indicating a timing of running/walking determination in Modification 1.

FIG. 5 is a view indicating a timing of running/walking determination in Modification 1 in the electronic equipment 1.

To further reduce processing load of the FFT, it can be considered to reduce the number of times of execution of the FFT. In this case, if the number of times is equally reduced, accuracy decreases by a degree corresponding to the reduced number of times of running/walking determination. In Modification 1, after running/walking determination is performed a plurality of times, for example, consecutively twice at a short interval ("consecutively" described here means that an interval is shorter than an interval other than an interval at which determination is performed a plurality of times, that is, a waiting period of time, for example, 5 seconds or the like, may be provided between a certain time and the next time among the plurality of times), the CPU 11 stands by for 55 seconds until the next running/walking determination. By confirming the determination of the running/walking state through such consecutive two times of frequency analysis and running/walking determination (confirming that the state is the running/walking state in a case where the state is consecutively determined as the running/walking state twice (displayed with white triangles)), it is possible to analyze a similar state and a slightly altered state and perform determination in a case where the state is not actually the running/walking state although measurement of the number of steps is continued, and the number of steps increases. By this means, in the electronic equipment 1, it is possible to increase a possibility of being able to specify that the state is not the running/walking state (displayed with black circles) through one of a plurality of consecutive times of running/walking determination.

In this case, it is only necessary to set the set intervals unequally as described above in the processing in step S112 in FIG. 4.

Conversely, in a case where it is determined through the frequency analysis of the first time that the state is not the running/walking state, such consecutive frequency analysis may be performed to check the determination. In other words, in a case where it is determined that the state is the running/walking state at the first time, the CPU 11 stands by for one minute as it is, and in a case where it is determined that the state is not the running/walking state at the first time, the frequency analysis is consecutively executed again, and in a case where it is consecutively determined that the state is not the running/walking state twice, it may be confirmed that the state is not the running/walking state.

Modification 2

Figure 6:
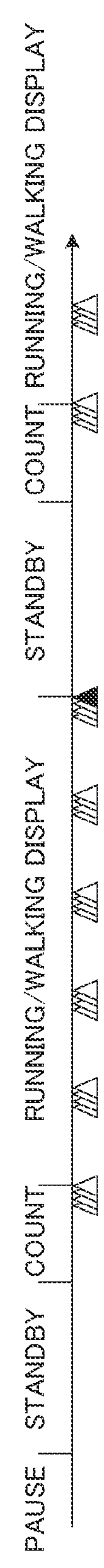
FIG. 6 This is a view indicating a timing of frequency analysis processing related to running/walking determination in Modification 2.

FIG. 6 is a view indicating a timing of frequency analysis processing related to running/walking determination in Modification 2 in the electronic equipment 1.

The processing load of the frequency analysis processing using the FFT is large in comparison to the capability of a CPU of an electronic watch, a pedometer, or the like, and the frequency analysis processing requires some time for processing. In a case where FFT is executed in parallel with other processing, if it is tried to complete the FFT in one time of processing, there is a problem that other processing stops during the period of time. Particularly, in a case where there is other processing that is to be periodically performed, there can be a case where processing of the FFT is not completed during the interval of the other processing. Thus, in this electronic equipment 1, the processing of FFT analysis (processing of deriving frequency characteristics of time-series data) is divided into a plurality of calculation periods of time and is executed for each short period of time at appropriate processing timings. By this means, in the electronic equipment 1, other processing can be put in the middle of the processing of frequency analysis.

Here, the processing of the FFT is divided into four and executed (timings are displayed with respective triangles), and whether or not the state is the running/walking state is determined (a timing at which it is determined that the state is not the running/walking state among display of triangles related to the last FFT divided into four is displayed with a black triangle) immediately after the FFT is completed. The size of the time-series data of the acceleration to be subjected to FFT analysis every time is the same, and thus, the number of divisions and divided portions of the processing may be fixed, and the calculation period of time of each portion divided in accordance with the divided portions may be different from each other.

Further, if the processing of the FFT is divided in this manner or not may be switched in accordance with whether or not processing (specific processing) that can be executed in parallel is implemented (processing as a division controller). In other words, in a case where specific processing is not executed in parallel, as in the above-described embodiment, the processing of frequency analysis using FFT may be executed at one time without being divided.

FIG. 7 is a flowchart indicating control procedure of running/walking measurement control processing including the running/walking determination of Modification 2. In this running/walking measurement control processing, processing in steps S121 and S122 is added between step S107 and step S108, to the running/walking measurement control processing in the above-described embodiment, and the processing of FFT analysis in the processing in steps S108 and S112 can be divided into a plurality of periods of time in accordance with the processing in step S122.

If the processing flow branches into "Yes" in step S107, the CPU 11 determines whether or not the above-described specific processing is executed (step S121). In a case where it is determined that the specific processing is executed (step S121: Yes), the CPU 11 performs setting of dividing the processing of FFT analysis into a plurality of times (step S122). Then, the processing of the CPU 11 transitions to step S108. In a case where it is determined that the specific processing is not executed (step S121: No), the processing of the CPU 11 transitions to step S108. In other words, in this case, the processing of FFT analysis is not divided into a plurality of calculation periods of time.

The processing in steps S121 and S122 by the CPU 11 corresponds to a division processor of the present invention.

As described above, the electronic equipment 1 as the information processing device of the present embodiment includes the CPU 11. The CPU 11 derives frequency characteristics of time-series data of the measurement result by the acceleration sensor 161 (steps S108, S112 in FIG. 4 and FIG. 7) as a calculator and determines whether or not the time-series data indicates the running/walking state in accordance with whether or not all determination conditions including at least a first condition and a second condition are satisfied as a running/walking determiner, the first condition being a condition that a frequency having maximum intensity in the derived frequency characteristics is equal to or higher than a lowest frequency fhmin set in advance related to a running/walking state by biped locomotion, and the second condition being a condition that at least one of a frequency f(P1) having maximum intensity S(P1) or a frequency f(P2) having second largest intensity S(P2) in the frequency characteristics falls within a range equal to or higher than the lowest frequency (fhmin) and equal to or lower than a highest frequency fmax set in advance related to the running/walking state (steps S109, S113 in FIG. 4 and FIG. 7).

By performing running/walking determination of removing a state where a peak exists in a low frequency component and a state where there is no peak within a range assumed in running/walking by performing simple frequency analysis as described above, it is possible to more reliably determine a condition that is difficult to be determined in measurement of the number of steps in real time. Thus, this electronic equipment 1 can determine the running/walking state through easy processing.

Further, the CPU 11 may determine a frequency with the second largest intensity in the second condition among local maximum values in frequency spectral distribution. Actually, a peak in the one-step cycle is likely to be separate from a peak in the two-step cycle as described above, and thus, even in a case where a peak other than walking exists in the vicinity of a certain peak, it is possible to make it easier for the electronic equipment 1 to specify a peak related to walking.

Further, the determination conditions include maximum intensity (interval maximum intensity) in a range equal to or higher than the lowest frequency (fhmin) in the frequency characteristics (frequency spectral distribution) and equal to or lower than the highest frequency fmax, and a frequency obtained through frequency analysis (processing as a calculator).

In this manner, as a result of a third condition for comparing the maximum intensity with the average value Sa of the spectral intensity being included in the determination conditions (steps S109, S113 in FIG. 4 and FIG. 7) in addition to the above-described first and second conditions, it is possible to further improve appropriateness that the maximum intensity occurs by running/walking.

Further, particularly, the third condition may be a condition that the interval maximum intensity in the frequency characteristics (frequency spectral distribution) is greater than the average value Sa of the spectral intensity by equal to or greater than a reference value dSth related to running/walking (steps S109, S113 in FIG. 4 and FIG. 7).

In other words, by adding a determination condition that requires that local maximum values of spectral intensity within a frequency range assumed in running/walking be sufficiently high in comparison to the spectral intensity of other frequencies, a case can be excluded where a frequency with spectral intensity eventually relatively high with respect to others is within the frequency range assumed in running/walking. Such a case includes a state close to a rest state with no significant movement (acceleration) as a whole, a state where movement at a frequency other than the frequency range assumed in running/walking occurs, for example, movement by means other than running/walking, such as a bicycle, and a state where influence of disturbance is superimposed. In other words, it is possible to more appropriately exclude a case from running/walking state, where the number of steps is erroneously determined in a case where an object in which vibration that is not largely different from a running/walking level occurs is used or carried.

Further, the time-series data is a magnitude of the acceleration vector obtained through measurement by the acceleration sensor 161 for three axis directions that are orthogonal to one another. While characteristic vibration can occur in each of the axis directions during running/walking, there is a case where individual characteristics significantly appear or do not appear depending on running/walking aspects. By synthesizing these and processing these as a magnitude of the acceleration vector, the electronic equipment 1 can collectively extract these characteristics and comprehensively determine the running/walking state without classifying processing content and while reducing a processing amount itself. The electronic equipment 1 can therefore more reliably determine the running/walking state through easier processing.

Further, the CPU 11 measures the number of steps on the basis of the time-series data as a step measurer (step S106 in FIG. 4 and FIG. 7). In a case where measurement of the number of steps is continued through the processing as the step measurer (step S107: Yes), the CPU 11 causes determination of the running/walking state to be periodically performed as a determination operation controller (steps S109, S113 in FIG. 4 and FIG. 7). In other words, the electronic equipment 1 can separate running/walking determination from measurement of the number of steps on the basis of different principle. This makes it possible to appropriately determine the running/walking state that is difficult to be specified in measurement of the number of steps, through walking determination, so that the electronic equipment 1 can more appropriately determine the running/walking state. Particularly, even for a case that can be recognized as a characteristic acceleration change pattern in accordance with landing/leaving, or the like, by running/walking in the time-series data through measurement of the steps, a case that cannot be regarded as the running/walking state through frequency analysis can be appropriately separated and determined as a non-running/walking state, so that by stopping measurement of the number of steps in this case, excessive measurement of the number of steps that have not actually been taken can be avoided. Further, by performing determination of the running/walking state only while the number of steps is measured, it is possible to reduce power consumption by reducing a frequency of implementation of frequency analysis (FFT) that is relatively high load in the electronic equipment 1 that often operates with low load. In this case, in a case where the user is not running/walking, even if determination of the running/walking state is not performed, the number of steps to be measured does not increase in any case.

Further, a frequency at which the time-series data is acquired is equal to or lower than four times the highest frequency fmax. By acquiring data from the acceleration sensor 161 at a sampling frequency low to a degree at which running/walking can be detected compared to a case where data is acquired at a higher sampling frequency at which detailed analysis can be performed, the electronic equipment 1 can more reliably determine the running/walking state while reducing load related to frequency analysis of the measurement data. Further, the frequency range in which the frequency spectral distribution is to be obtained is limited to a narrow range, and thus, it is possible to prevent a case where determination processing becomes difficult due to occurrence of a number of local maximum values other than peaks related to the one-step cycle and the two-step cycle due to noise, or the like, in detection of the local maximum values of the frequency spectrum.

Further, the CPU 11 consecutively performs determination of the running/walking state a plurality of times set in advance as a running/walking determiner and in a case where it is determined that the state is not the running/walking state in the determination of one of the plurality of times, confirms that the state is not the running/walking state.

In a case where the state is not actually the running/walking state although the number of steps increases in the pedometer, there is a case where the determination result of the running/walking determination does not necessarily become a clear result. However, by consecutively performing running/walking determination a plurality of times at short time intervals, it is possible to increase a probability of being able to determine a case where the state is not the running/walking state at least once in the electronic equipment 1. Particularly, if frequency analysis (FFT) is always repeated at short time intervals, the processing load becomes high and power consumption also increases, and thus, in the electronic equipment 1, by determination being executed at a certain interval between a set of running/walking determination that is consecutively performed a plurality of times and a set of running/walking determination that is consecutively performed a plurality of times next, it is possible to prevent increase in power consumption while more reliably performing determination of the non-running/walking state.

Further, the CPU 11 stands by (step S115 in FIG. 4 and FIG. 7) since the CPU 11 had determined that the state is not the running/walking state (step S110 in FIG. 4, FIG. 7) as a running/walking determiner until when the second reference period of time has elapsed, maintains determination that the state is not the running/walking state (step S116 in FIG. 4 and FIG. 7), and cancels execution of specific processing (step S115 in FIG. 4 and FIG. 7) while the determination is maintained. In a case where it is determined that the state is not the running/walking state in a state where specific processing is performed assuming that the state is the running/walking state, if the specific processing remains valid also immediately after the determination, running/walking determination that is independently performed becomes meaningless, and thus, by performing specific processing, running/walking determination, and the like, again after maintaining the non-running/walking state for a while and cancelling the specific processing, the result of the running/walking determination can be appropriately handled in the electronic equipment 1.

Further, the above-described specific processing is processing of counting the number of steps. If measurement of the number of steps that is performed in parallel to running/walking determination remains valid also in a case where it is determined that the state is not the running/walking state, the number of steps that is not related to running/walking increases, and thus, by canceling counting of the number of steps in accordance with a result of the running/walking determination, the number of steps can be measured more correctly.

Further, the CPU 11 derives frequency characteristics of the time-series data in the target period of time of the length set in advance including the latest data as a calculator, and the target period of time is determined so that the target time-series data for which frequency characteristics are to be derived does not overlap with each other. In other words, by performing FFT on the latest time-series data obtained during a period of time shorter than time intervals (execution intervals of running/walking determination) at which FFT is performed a plurality of times, the number of pieces of data to be subjected to FFT processing decreases, so that it is possible to end the frequency analysis processing in a short period of time.

Further, the CPU 11 derives the frequency characteristics while dividing a calculation period of time into a plurality of calculation periods of time as a calculator. The CPU 11 with low specs is likely to take time in FFT. In the electronic equipment 1 such as an electronic watch and an active mass-meter, other processing that is repeatedly performed in a short cycle is also performed, and thus, there is a case where the frequency analysis processing does not end within this cycle and negatively affects other functions of the electronic equipment 1. Thus, by dividing the frequency analysis processing into a plurality of calculation periods of time so that the processing can be distributed over a plurality of cycles, running/walking determination can be stably performed along with other functions in the electronic equipment 1.

Further, the CPU 11 determines whether or not to divide the calculation period of time in accordance with whether or not there is specific processing different from the processing of deriving frequency characteristics of time-series data as a division controller (steps S121, S122 in FIG. 7). The division of the frequency analysis processing as described above does not necessarily have to be performed in a case where the processing is not performed in parallel with other processing that interferes with each other. Thus, in the electronic equipment 1, whether or not to divide the frequency analysis processing may be switched in accordance with whether or not there is such specific processing. This can save trouble such as handover of data between divided calculations in a case where frequency analysis processing can be collectively performed at one time, so that it is possible to end the frequency analysis processing in a short period of time.

Further, the measurement device of the present embodiment includes the acceleration sensor 161 and an information processing device including the above-described CPU 11. According to such a measurement device, it is possible to more appropriately determine the running/walking state through easy processing by operation of the above-described information processing device (CPU 11).

Further, the information processing method of the present embodiment includes calculating to derive frequency characteristics of time-series data of a measurement result by the acceleration sensor 161, and running/walking determining to determine whether or not the time-series data indicates a running/walking state in accordance with whether or not all determination conditions including at least a first condition and a second condition are satisfied, the first condition being a condition that a frequency having maximum intensity (maximum intensity frequency f(P1)) in the frequency characteristics derived in the calculating is equal to or higher than a lowest frequency fhmin related to the running/walking state set in advance, and the second condition being a condition that at least one of the maximum intensity frequency f(P1) having maximum intensity or a second largest intensity frequency f(P2) that is the second largest in the frequency characteristics falls within a range equal to or higher than the lowest frequency fhmin and equal to or lower than a highest frequency fmax related to the running/walking state set in advance. By performing determination of the running/walking state in this manner, it is possible to more reliably determine a condition that is difficult to be determined in measurement of the number of steps in real time, through easy processing with low load.

Further, by the program 121 that causes a computer to function so as to perform running/walking determination using the above-described information processing method being installed in the computer and executed, it is possible to determine the running/walking state easily and more appropriately through software processing by the CPU 11 without the need of other hardware for control calculation.

Note that the present invention is not limited to the above-described embodiment, and various changes are possible.

For example, while in the above-described embodiment, it is determined that the state is the running/walking state in a case where all of the first to the third conditions are satisfied, the third condition does not necessarily have to be included in the determination conditions for running/walking determination. Accuracy of running/walking determination can be improved only through determination with the first condition and the second condition. Further, while a fixed reference value dSth is used in the third condition, it is only necessary that a reference with which it can be determined that a peak of a frequency having maximum intensity is a peak meaningful as a peak related to running/walking compared to other frequency bands, and, for example, the reference value dSth may be dynamically changed. Alternatively, other conditions may be included in the determination conditions in addition to the above-described first to third conditions.

Further, while a case has been described in the above-described embodiment where running/walking determination is periodically performed at certain time intervals, and a case has been described in Modification 1 where running/walking determination is consecutively performed a plurality of times in units of set, the present invention is not limited to these. For example, the previous determination condition may be quantitatively evaluated, and an interval to the next running/walking determination may be dynamically determined.

Further, while in the above-described embodiment, a case has been described where running/walking determination is started after the mode transitioned to the counting mode, and the number of steps has been measured for equal to or longer than the first reference period of time, running/walking determination may be performed for a part of the standby state. Further, the counting mode may be determined depending on the measured number of steps instead of the first reference period of time or may be determined by combination of the first reference period of time and the measured number of steps.

Further, while in the above-described embodiment, whether or not to divide the frequency analysis processing into a plurality of calculation periods of time is determined in accordance with whether or not there is specific processing, determination as to whether or not to divide the frequency analysis processing is not limited to this. For example, there may be a case where whether or not to divide the frequency analysis processing is determined in accordance with a magnitude of total processing load of the CPU 11.

Further, while in the above-described embodiment, description has been provided assuming that the CPU 11 always operates, there is equipment among the electronic equipment 1 with low power consumption, that can perform intermittent operation in which the CPU 11 is activated at certain time intervals (for example, at intervals of one second) and caused to perform necessary operation and is paused while there is no operation. If processing of dividing the frequency analysis processing is performed in such a case, it takes long time until the processing ends, and thus, division of the frequency analysis processing does not have to be performed during intermittent operation.

Further, while in the above-described embodiment, description has been provided assuming that measurement of the number of steps is performed completely independently of running/walking determination, the present invention is not limited to this. In a case where the number of steps measured within the target period of time is largely separate from the number of steps assumed from the maximum intensity frequency f(P1) or the second largest intensity frequency f(P2) obtained through frequency analysis, some adjustment may be performed on measurement of the number of steps within a range that does not lose meaning of determination being separately performed, for example, mainly on the basis of frequency spectral distribution obtained through running/walking determination.

Further, while in the above-described embodiment, description has been provided assuming that in a case where it is determined through running/walking determination that the state is not the running/walking state, the non-running/walking state is maintained as the standby mode until the second reference period of time has elapsed without exception, the present invention is not limited to this. For example, in a case where running/walking determination is repeated for each second reference period of time, and there is no change in the determination result or, more specifically, satisfaction conditions of the first to the third conditions or the like, the standby mode (non-running/walking state) may be further extended for each second reference period of time without returning the mode to the counting mode. Alternatively, in a case where running/walking determination is performed in the middle of the second reference period of time, for example, when half of the period of time has elapsed, and the above-described satisfaction conditions or the like change, the standby mode may be released, and the mode may transition to the counting mode.

Further, while in the above-described embodiment, description has been provided assuming that the electronic equipment 1 is a wristwatch to be worn on the arm, a pedometer to be stored in a pocket, or the like, the electronic equipment 1 is not limited to these. The electronic equipment 1 may be equipment to be used in various aspects such as equipment to be stored in a bag, equipment to be worn on other sites of the body, and equipment to be held in the hand. Further, depending on a worn or held state, substantially similar results can be obtained, for example, only with acceleration in two axis directions instead of acceleration in three axis directions being measured.

Further, while in the above-described embodiment, description has been provided assuming that the electronic equipment 1 itself that is the measurement device performs processing related to determination of running/walking and measurement of the number of steps, other devices may perform the processing. In other words, the acceleration data acquired at the electronic equipment 1 may be transmitted to external equipment via the communicator 15, and the external equipment as the information processing device may perform processing such as running/walking determination.

Further, while in the above-described embodiment, description has been provided assuming that running/walking determination is used to determine whether or not to continue measurement of the number of steps, the present invention is not limited to this. The result of running/walking determination may be used to interrupt other specific processing that assumes the running/walking state, for example, processing of specifying a moving distance and a migration route during running/walking concurrently using satellite positioning, or the like.

Further, while in the above description, the storage 12 having a non-volatile memory such as a flash memory has been described as an example of a computer readable medium that stores the program 121 of information processing related to running/walking measurement control of the present invention, the computer readable medium is not limited to these. As other computer readable media, other non-volatile memories such as an HDD and an MRAM, and portable recording media such as a CD-ROM and a DVD disc can be applied. Further, a carrier wave is also applied to the present invention as a medium that provides data of the program according to the present invention via a communication line.

In addition, specific configurations, operation, content and procedure of the processing of the CPU, and the like, described in the above-described embodiment can be changed as appropriate in a range not deviating from the gist of the present invention. The scope of the present invention includes the scope of the invention recited in the claims and equivalents thereof.

While some embodiments of the present invention have been described, the scope of the present invention is not limited to the above-described embodiments and includes the scope of the invention recited in the claims and equivalents thereof.

Industrial Applicability

The present invention can be utilized in an information processing device, a measurement device, an information processing method, and a program.

REFERENCE SIGNS LIST

1 Electronic equipment
11 CPU
12 Storage
121 Program
13 Operation acceptor
14 Display
15 Communicator
16 Sensor
161 Acceleration sensor
162 Tilt sensor
17 Oscillation circuit
18 Divider circuit
19 Clocking circuit
20 Timer circuit
Sa Average value
dSth Reference value
fhmin Lowest frequency
fmax Highest frequency

The invention claimed is:

1. An information processing device comprising:
at least one processor configured to;
derive frequency characteristics of time-series data of a measurement result by an acceleration sensor; and
determine whether or not the time-series data indicates a running/walking state in accordance with whether or not all determination conditions including at least a first condition, a second condition, and a third condition are satisfied,
the first condition being a condition indicating that a frequency having a maximum intensity in the derived frequency characteristics is equal to or higher than a lower limit frequency set in advance related to the running/walking state that is a state of walking or running by biped locomotion,
the second condition being a condition indicating that at least one of the frequency having the maximum intensity or a frequency having second largest intensity in the frequency characteristics falls within a range equal to or higher than the lower limit frequency and equal to or lower than an upper limit frequency set in advance related to the running/walking state, and the third condition being a condition based on a magnitude relationship between an interval maximum intensity in a range equal to or higher than the lower limit frequency and equal to or lower than the upper limit frequency in the frequency characteristics and an average intensity of the derived frequency characteristics, the interval maximum intensity in the frequency characteristics being larger than the average intensity of the frequency characteristics by equal to or greater than a reference width related to the running/walking state.

2. The information processing device according to claim 1, wherein the at least one processor is configured to determine the frequency having the second largest intensity in the second condition among local maximum values in the frequency characteristics.

3. The information processing device according claim 1, wherein the time-series data is a magnitude of an acceleration vector obtained through measurement by the acceleration sensor for three axis directions orthogonal to one another.

4. The information processing device according to claim 1, wherein the at least one processor is configured to measure a number of steps on a basis of the time-series data, and wherein in a case where measurement of the number of steps is continued, the at least one processor is configured to cause the determination to be periodically performed.

5. The information processing device according to claim 1, wherein a frequency at which the time-series data is acquired is equal to or lower than four times the upper limit frequency.

6. The information processing device according to claim 1, wherein the at least one processor is configured to consecutively perform the determination a plurality of times set in advance, and in a case where it is determined in determination of one of the plurality of times that a state is not the running/walking state, confirm that the state is not the running/walking state.

7. The information processing device according to claim 1, wherein the at least one processor is configured to maintain the determination that the state is not the running/walking state after determining that the state is not the running/walking state until a reference period of time has elapsed, and cancel specific processing while the determination is maintained.

8. The information processing device according to claim 7, wherein the specific processing is processing of counting the number of steps.

9. The information processing device according claim 1, wherein the at least one processor is configured to derive the frequency characteristics of the time-series data in a target period of time of a length set in advance including latest data, and wherein the target period of time is determined so that a target time-series data for which the frequency characteristics are to be derived does not overlap with each other.

10. The information processing device according to claim 1, wherein the at least one processor is configured to derive the frequency characteristics while dividing a calculation period of time into a plurality of calculation periods of time.

11. The information processing device according to claim 10, wherein the at least one processor is configured to derive whether or not to divide the calculation period of time in accordance with whether or not there is specific processing different from processing of determining the frequency characteristics of the time-series data.

12. A measurement device comprising:

the acceleration sensor; and the information processing device according to claim 1.

13. An information processing method comprising:

deriving frequency characteristics of time-series data of a measurement result by an acceleration sensor; and determining whether or not the time-series data indicates a running/walking state in accordance with whether or not all determination conditions including at least a first condition, a second condition, and a third condition are satisfied, the first condition being a condition indicating that a frequency having a maximum intensity in the derived frequency characteristics is equal to or higher than a lower limit frequency set in advance related to the running/walking state that is a state of walking or running by biped locomotion, the second condition being a condition indicating that at least one of the frequency having the maximum intensity or a frequency having second largest intensity in the frequency characteristics falls within a range equal to or higher than the lower limit frequency and equal to or lower than an upper limit frequency set in advance related to the running/walking state, and the third condition being a condition based on a magnitude relationship between an interval maximum intensity in a range equal to or higher than the lower limit frequency and equal to or lower than the upper limit frequency in the frequency characteristics and an average intensity of the derived frequency characteristics, the interval maximum intensity in the frequency characteristics being larger than the average intensity of the frequency characteristics by equal to or greater than a reference width related to the running/walking state.

14. A non-transitory computer-readable storage medium having a program stored thereon for causing a computer to at least:

derive frequency characteristics of time-series data of a measurement result by an acceleration sensor; and determine whether or not the time-series data indicates a running/walking state in accordance with whether or not all determination conditions including at least a first condition, a second condition, and a third condition are satisfied, the first condition being a condition indicating that a frequency having a maximum intensity in the derived frequency characteristics is equal to or higher than a lower limit frequency set in advance related to the running/walking state that is a state of walking or running by biped locomotion, the second condition being a condition indicating that at least one of the frequency having the maximum intensity or a frequency having second largest intensity in the frequency characteristics falls within a range equal to or higher than the lower limit frequency and equal to or lower than an upper limit frequency set in advance related to the running/walking state, and the third condition being a condition based on a magnitude relationship between an interval maximum intensity in a range equal to or higher than the lower limit frequency and equal to or lower than the upper limit frequency in the frequency characteristics and an average intensity of the derived frequency characteristics, the interval maximum intensity in the frequency characteristics being larger than the average intensity of the frequency characteristics by equal to or greater than a reference width related to the running/walking state.

* * * * *